United States Patent
Nagaoka et al.

(10) Patent No.: US 9,921,568 B2
(45) Date of Patent: Mar. 20, 2018

(54) TRAJECTORY MEASURING DEVICE, NUMERICAL CONTROL DEVICE, AND TRAJECTORY MEASURING METHOD

(71) Applicant: Mitsubishi Electric Corporation, Tokyo (JP)

(72) Inventors: Kotaro Nagaoka, Tokyo (JP); Tomoya Fujita, Tokyo (JP); Masahiro Ozawa, Tokyo (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 151 days.

(21) Appl. No.: 15/035,503

(22) PCT Filed: Dec. 5, 2013

(86) PCT No.: PCT/JP2013/082742
§ 371 (c)(1),
(2) Date: May 10, 2016

(87) PCT Pub. No.: WO2015/083275
PCT Pub. Date: Jun. 11, 2015

(65) Prior Publication Data
US 2016/0370786 A1    Dec. 22, 2016

(51) Int. Cl.
*G05B 19/23* (2006.01)
*G05B 19/4062* (2006.01)

(52) U.S. Cl.
CPC ......... *G05B 19/23* (2013.01); *G05B 19/4062* (2013.01); *G05B 2219/34015* (2013.01); *G05B 2219/42342* (2013.01)

(58) Field of Classification Search
CPC ............... G05B 19/23; G05B 19/4062; G05B 2219/34015; G05B 2219/42342;
(Continued)

(56) References Cited

U.S. PATENT DOCUMENTS

2002/0043944 A1    4/2002    Matsubara et al.
2006/0186849 A1    8/2006    Iwashita et al.
(Continued)

FOREIGN PATENT DOCUMENTS

EP    0510204    * 10/1992    ........... G05B 19/401
JP    06-274228 A    9/1994
(Continued)

OTHER PUBLICATIONS

Japanese Notice of Rejection issued in JP 2014-531027 dated Oct. 14, 2014 pp. 6.
(Continued)

*Primary Examiner* — Miranda Huang
*Assistant Examiner* — Olvin Lopez Alvarez
(74) *Attorney, Agent, or Firm* — Sughrue Mion, PLLC; Richard C. Turner

(57) ABSTRACT

A trajectory measuring device that measures a moving trajectory of a moving target in a machine including three or more movable axes for the moving target, the trajectory measuring device including a trajectory calculating unit that calculates, for each plane having two movable axes among the movable axes as coordinate axes, the moving trajectory on the plane by using command conditions to the moving target including an inter-axis phase difference among the movable axes, command signals to the movable axes generated on the basis of the inter-axis phase difference, and feedback signals indicating positions of the movable axes at time when the movable axes are feedback-controlled such that the positions of the movable axes follow the command signals.

4 Claims, 9 Drawing Sheets

(58) Field of Classification Search
CPC ...... G05B 19/4068; G05B 2219/35313; G05B 2219/35321–2219/35323; G05B 2219/35325; G05B 2219/35349; G05B 2219/39219
USPC .......................................................... 700/57
See application file for complete search history.

(56) References Cited

U.S. PATENT DOCUMENTS

2011/0246132 A1    10/2011    Sato et al.
2013/0076287 A1*    3/2013    Iwashita ............ G05B 19/4068
                                                                                                                                         318/561

FOREIGN PATENT DOCUMENTS

| JP | 2002-103182 A | 4/2002 |
| --- | --- | --- |
| JP | 2002-120128 A | 4/2002 |
| JP | 2006-227886 A | 8/2006 |
| JP | 2010-211554 A | 9/2010 |
| JP | 2011-115885 A | 6/2011 |
| JP | 2011-165066 A | 8/2011 |
| JP | 2013-214231 A | 10/2013 |
| WO | 2010/067651 A1 | 6/2010 |

OTHER PUBLICATIONS

Japanese Decision of a Patent Grant issued in JP 2014-531027 dated Mar. 24, 2015 pp. 5.

* cited by examiner

XY PLANE

YZ PLANE

XZ PLANE

XY PLANE

YZ PLANE

XZ PLANE

TRAJECTORY MEASURING DEVICE, NUMERICAL CONTROL DEVICE, AND TRAJECTORY MEASURING METHOD

CROSS REFERENCE TO RELATED APPLICATIONS

This is a National Stage of International Application No. PCT/JP2013/082742 filed Dec. 5, 2013, the contents of which are incorporated herein by reference in its entirety.

FIELD

The present invention relates to a trajectory measuring device, a numerical control device, and a trajectory measuring method for measuring a motion trajectory at the time when a command is given to an axis feed driving system of a machine or the like.

BACKGROUND

A machine (e.g., a machining center or a laser processing machine) such as a processing machine drives a servomotor to thereby control the position of a machining head or the like. When the position of the machining head or the like is controlled, the machining head is controlled such that a route between a start point and an end point of movement accurately follows a commanded route. An axis driven by the servomotor is called feed axis. A two-dimensional or three-dimensional moving trajectory is realized by using a plurality of the feed axis.

The machining head is provided with position detectors such as encoders or linear scales at the respective feed axes. Control using feedback (hereafter, feedback control) is performed such that a difference between a position detected by the position detectors (a feedback position) and a command position decreases. Consequently, the machining head moves while following a given command route.

A trajectory of the feedback position (a feedback trajectory) desirably coincides with a trajectory of the command position (a command trajectory). However, a trajectory error actually occurs between the feedback trajectory and the command trajectory because of various factors.

In machines in recent years, machining accuracy in machining is deteriorated when the trajectory error is large. Therefore, a trajectory error at the time when a circular motion or the like is performed is measured; and adjustment of control parameters, review of a machine configuration, and the like are performed on the basis of a result of the measurement. Conventionally, when a trajectory error during a motion is evaluated, the motion is performed by using a plurality of axes. A feedback trajectory at that time is measured. For example, a numerical control device of Patent Literature 1 collects the position of a servo axis and the position of a spindle axis at the same time at every predetermined cycle, and it converts collection position data in order to calculate machining shape data.

CITATION LIST

Patent Literature

Patent Literature 1: Japanese Patent Application Laid-Open No. 2002-120128

SUMMARY

Technical Problem

In the related art, measured data of the axes are directly displayed. Therefore, in order to evaluate trajectories of a command shape or the like on a plurality of planes when the machine is provided with a mode with three axes or more, it is necessary to execute a machining program for each of the measuring planes. Therefore, the measurement takes a long time.

For example, when trajectory errors on an XY plane, a YZ plane, and an XZ plane are to be evaluated in a machine under numerical control that has three feed axes, i.e., an X axis, a Y axis, and a Z axis, it is necessary to perform three measurements.

When a command radius is large, because machines move in wide ranges, there is a problem with interference among the machines occurring and, depending on the machine, the movable range of the machine is insufficient and measurement cannot be performed.

The present invention has been made in view of the above and it is an objective of the present invention to obtain a trajectory measuring device, a numerical control device, and a trajectory measuring method that can efficiently measure a trajectory in a machine provided with three or more feed axes.

Solution to Problem

In order to solve the problem and achieve the objective mentioned above, the present invention relates to a trajectory measurement device that measures a moving trajectory of a moving target in a machine provided with three or more movable axes for the moving target. The trajectory measuring device includes: a trajectory calculating unit. The trajectory calculating unit calculates, for each plane having two movable axes among the movable axes as coordinate axes, the moving trajectory on the plane by using: command conditions for the moving target including an inter-axis phase difference among the movable axes; command signals for the movable axes generated on the basis of the inter-axis phase difference; and feedback signals indicating positions of the movable axes when the movable axes are being controlled by using feedback such that the positions of the movable axes follow the command signals.

Advantageous Effects of Invention

According to the present invention, there is an effect whereby it is possible to efficiently measure a moving trajectory in a machine provided with three or more movable axes.

DESCRIPTION OF EMBODIMENTS

Trajectory measuring devices, numerical control devices, and trajectory measuring methods according to embodiments of the present invention are explained in detail below with reference to the drawings. Note that the present invention is not limited to the embodiments.

First Embodiment

Figure 1:
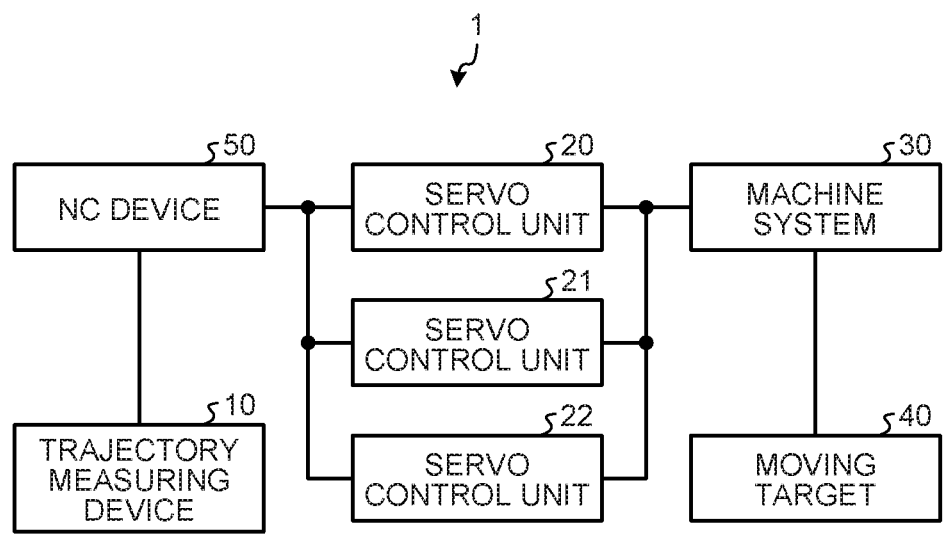
FIG. 1 is a block diagram illustrating an embodiment of the present invention.

FIG. 1 is a block diagram illustrating an embodiment of the present invention. A processing machine 1 is, for example, a laser processing machine. The processing machine 1 includes a trajectory measuring device 10, an NC device 50, servo control units 20 to 22, a machine system 30, and a moving target 40.

When the processing machine 1 is a laser processing machine, the moving target 40 is a machining head, a machining table, or the like. The trajectory measuring device 10 is a computer or the like that measures a trajectory of positions as the moving target 40 moves. The trajectory measuring device 10 is connected to the NC device 50. The trajectory measuring device 10 calculates the trajectory of the moving target 40 by using information (a feedback signal S2 explained below) acquired from the NC device 50.

The NC (Numerical Control) device 50 is a controller on a host side of the servo control units 20 to 22 and is connected to the trajectory measuring device 10 and the servo control units 20 to 22. When a command (a command signal S1 explained below) of the trajectory of the moving target 40 is input from the trajectory measuring device 10, the NC device 50 generates motion commands (S1X, S1Y, and S1Z explained below) of axes from the command signal S1 and outputs the motion commands respectively to the servo control units 20 to 22 of an X axis, a Y axis, and a Z axis. Consequently, the NC device 50 controls the servo control units 20 to 22 of the axes by using the command signal S1 from the trajectory measuring device 10. When feedback signals S2X, S2Y, and S2Z are input from the servo control unit 20, the NC device 50 outputs a total feedback signal S2 obtained by collecting feedback signals of the axes to the trajectory measuring device 10.

The servo control unit (an amplifier) 20 is a device that uses feedback to control a motor (a motor 32 explained below) such that the position of the X axis follows the command signal S1X. The servo control unit 20 controls the machine system 30 by using the command signal S1X and the feedback signal S2X acquired from the machine system 30. The servo control unit 20 outputs an instruction (a motor torque signal S5X explained below) for driving the motor 32 to the machine system 30 and acquires the feedback signal S2X from the machine system 30. The servo control unit 20 performs feedback-control on the machine system 30 by using the feedback signal S2X and outputs the feedback signal S2X to the NC device 50. The machine system 30 moves the moving target 40 by using the motor torque signal S5X. Similarly, the servo control unit 21 controls the Y axis and the servo control unit 22 controls the Z axis.

Figure 2:
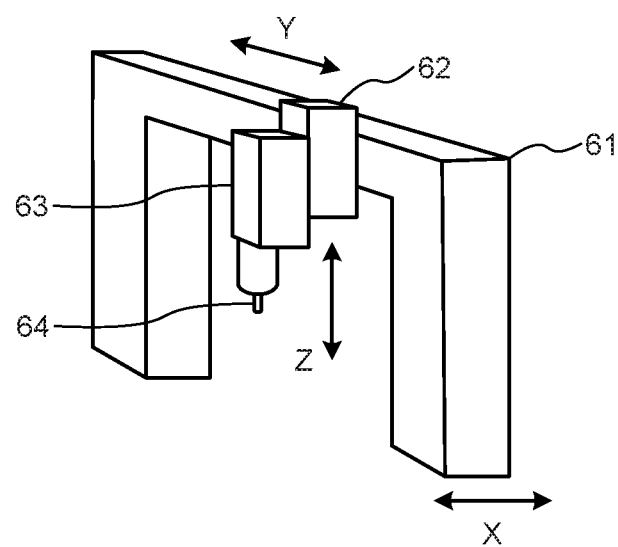
FIG. 2 is a diagram schematically illustrating a processing machine having three axes.

FIG. 2 is a diagram schematically illustrating a processing machine having three axes. In FIG. 2, as an example of a machine (machine tool) set as a control target, part of the machine system 30 including three feed axes is illustrated. Note that, in the following explanation of this embodiment, the trajectory measuring device 10 measures a circular trajectory. However, a trajectory measured by the trajectory measuring device 10 is not limited to the circular shape and can be any shape (an arc shape other than the circular shape, a curved line shape, a linear shape, etc.).

The laser processing machine includes a machining head 64, an X-axis movable unit 61 that moves the machining head 64 in an X-axis direction, a Y-axis movable unit 62 that moves the machining head 64 in a Y-axis direction, and a Z-axis movable unit 63 that moves the machining head 64 in a Z-axis direction. Note that the machining head 64 illustrated in FIG. 2 corresponds to the moving target 40 illustrated in FIG. 1.

The machining head 64 of the laser processing machine is attached to the Z-axis movable unit 63 and is driven in the Z-axis direction by a Z-axis motor not illustrated. A Z-axis driving mechanism including the Z-axis movable unit 63 and the Z-axis motor is attached to the Y-axis movable unit 62 and is driven in the Y-axis direction by a Y-axis motor not illustrated. Further, a Y-axis driving mechanism including the Y-axis movable unit 62 and the Y-axis motor is attached to the X-axis movable unit 61 and is driven in the X-axis direction by an X-axis motor not illustrated. An X-axis driving mechanism including the X-axis movable unit 61 and the X-axis motor is attached to a machine main body of the laser processing machine. Note that it is assumed that the X axis, the Y axis, and the Z axis are orthogonal to one another. The X-axis motor, the Y-axis motor, and the Z-axis motor are the motor 32 explained below.

The machining head 64 is moved in the X-axis direction, the Y-axis direction, and the Z-axis direction to thereby be moved along a moving route that draws, for example, an arc. The moving route (a trajectory) of the machining head 64 is measured by the trajectory measuring device 10.

Figure 3:
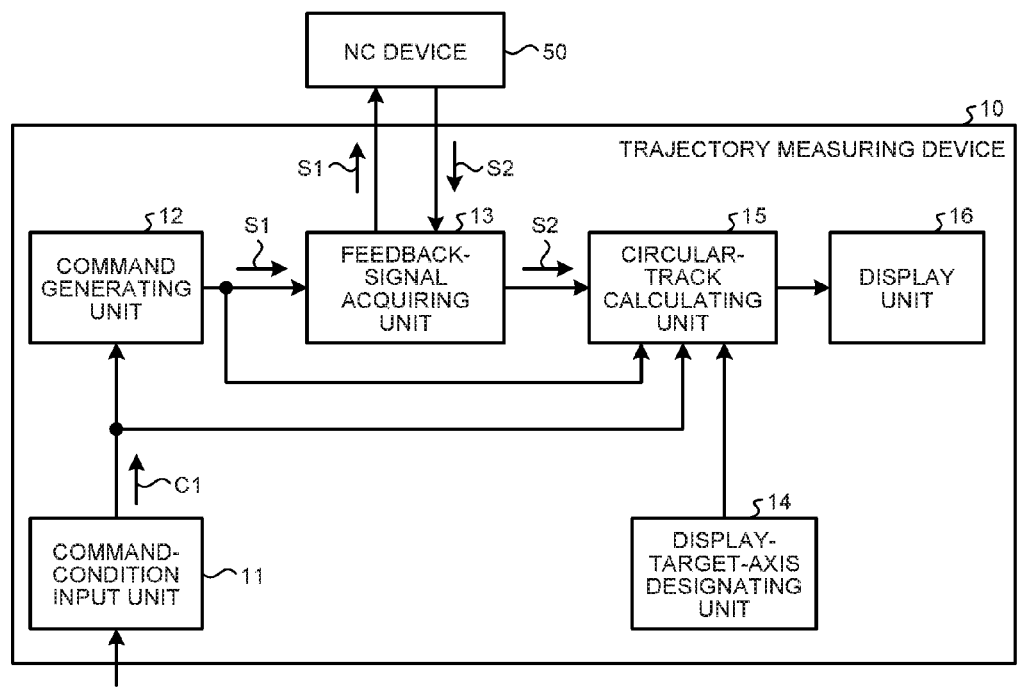
FIG. 3 is a block diagram illustrating the configuration of a trajectory measuring device according to a first embodiment.

FIG. 3 is a block diagram illustrating the configuration of the trajectory measuring device according to a first embodiment. The trajectory measuring device 10 includes a command-condition input unit 11, a command generating unit 12, a feedback-signal acquiring unit 13, a display-target-axis designating unit 14, a circular-trajectory calculating unit 15, and a display unit 16.

Command conditions C1 for the machining head 64 are input to the command-condition input unit 11. For example, the command conditions C1 for moving the machining head 64 such that the moving route of the machining head 64 draws an arc are an arc radius, feed velocity, and an inter-axis phase difference. The command-condition input unit 11 outputs an arc radius, the feed velocity, and the inter-axis phase difference to the command generating unit 12 and to the circular-trajectory calculating unit 15.

The command generating unit 12 generates, on the basis of information in a machining program, a command program for causing the servo control units 20 to 22 to perform predetermined operations. Specifically, the command generating unit 12 generates the command signal S1 having a sine wave shape on the basis of the arc radius, the feed velocity, and the inter-axis phase difference sent from the command-condition input unit 11. The command signal S1 is implemented as a G code program describing moving commands of the X axis, the Y axis, and the Z axis. The command generating unit 12 sends the generated command signal S1 to the feedback-signal acquiring unit 13 and the circular-trajectory calculating unit 15.

The feedback-signal acquiring unit 13 sends the command signal S1 to the NC device 50 and acquires the total feedback signal S2 from the NC device 50. A feedback signal S2X is a signal measured in the motor 32 when the servo control unit 20 feedback-controls the motor 32. The position of the motor 32 of each of the axes, which is given by the feedback signal S2X, are measured by using a position detector (a position detector 35 explained below) such as an encoder or a linear scale.

The feedback-signal acquiring unit 13 acquires the measured feedback signals S2X, S2Y, and S2Z as the total feedback signal S2 via the NC device 50. The feedback-signal acquiring unit 13 sends the feedback signal S2 to the circular-trajectory calculating unit 15.

The display-target-axis designating unit 14 designates two axes set as targets of circular display. The display-target-axis designating unit 14 sends information concerning the designated axes to the circular-trajectory calculating unit 15. The display-target-axis designating unit 14 sets three combinations, i.e., the X axis and the Y axis, the Y axis and the Z axis, and the X axis and the Z axis, and sends the combinations to the circular-trajectory calculating unit 15. The display-target-axis designating unit 14 can designate the axes on the basis of the machining program or can designate the axes according to an instruction from a user.

The circular-trajectory calculating unit 15 calculates circular trajectory data for displaying on the basis of the feedback signal S2, the command signal S1, and the command conditions C1. The circular-trajectory calculating unit 15 calculates circular trajectory data for displaying with respect to the axes designated by the display-target-axis designating unit 14. The circular-trajectory calculating unit 15 sends a calculation result (circular trajectory data) to the display unit 16. The display unit (a display control unit) 16 causes an external display device (not illustrated in the figure) such as a display device to display the circular trajectory data calculated by the circular-trajectory calculating unit 15.

Figure 4:
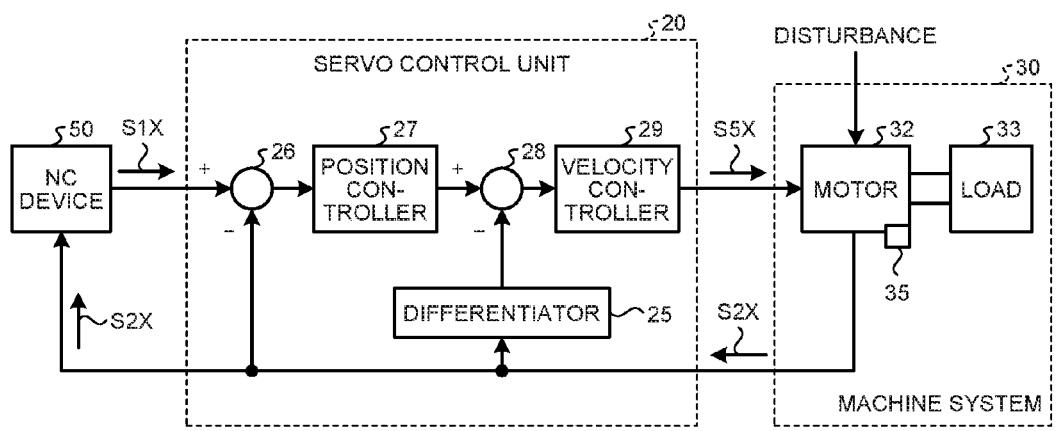
FIG. 4 is a diagram illustrating the configuration of a feedback control system for an X axis.

FIG. 4 is a diagram illustrating the configuration of a feedback control system for the X axis. The feedback control system of the X axis is a configuration that uses the servo control unit 20 and the machine system 30. Note that, in FIG. 4, only the feedback control system for one axis is illustrated. However, in the processing machine 1, the feedback control system illustrated in FIG. 4 is configured for each of the X axis, the Y axis, and the Z axis.

The servo control unit 20 includes a subtracter 26, a position controller 27, a subtracter 28, a speed controller 29, and a differentiator 25. The servo control unit 20 calculates, by using the command signal S1X sent from the NC device 50, the motor torque signal S5X for controlling the machine system 30. The command signal S1X sent from the NC device 50 is a command concerning the motion of the X-axis motor generated by the NC device 50 from the moving command S1 generated by the trajectory measuring device 10.

The command signal S1X sent from the NC device 50 and the feedback signal S2X sent from the machine system 30 are input to the subtracter 26. The subtracter 26 subtracts the feedback signal S2X from the command signal S1X to thereby calculate a position error of the motor 32. The subtracter 26 outputs the calculated position error to the position controller 27.

The position controller 27 has a function of performing control such as proportional control on the position error. The position controller 27 calculates a speed signal corresponding to the calculated position error and outputs the speed signal to the subtracter 28. The differentiator 25 differentiates the feedback signal S2X to thereby calculate a speed signal and outputs the speed signal to the subtracter 28.

The subtracter 28 subtracts the speed signal output from the differentiator 25 from the speed signal output from the position controller 27 to thereby calculate a speed error of the motor 32. The subtracter 28 outputs the calculated speed error to the speed controller 29.

The speed controller 29 has a function of performing control such as proportional/integral control on the speed error. The speed controller 29 calculates the motor torque signal S5X corresponding to the speed error and outputs the motor torque signal S5X to the machine system 30.

The machine system 30 is driven by the motor torque signal S5X. The machine system 30 includes the motor 32 and a load 33. The load 33 corresponds to the X-axis movable units 61 of the axes. Similarly, in the feedback control system for the Y axis, the load 33 corresponds to the Y-axis movable unit 62. In the feedback control system for the Z axis, the load 33 corresponds to the Z-axis movable unit 63.

In the machine system 30, the positions of the movable units are detected by using the position detector 35 attached to the motor 32 so that output is sent to the servo control unit 20 as the feedback signal S2X. The feedback signal S2X is sent to the feedback-signal acquiring unit 13 via the NC device 50. In the servo control unit 20, the feedback signal S2X is input to the subtracter 26 and the differentiator 25. The motor 32 receives disturbances because of the influence of friction, elastic deformation, or the like of the machine system 30. This affects the feedback signal S2X.

The operation of the processing machine 1 in measuring a circular trajectory is explained here. The processing machine 1 such as the laser processing machine controls the positions of the machining head 64 and the like by driving the motor 32 (a servomotor). When the positions of the machining head 64 and the like are controlled, the machining head 64 is controlled such that a route between a start point and an end point of movement accurately follows a route designated by the command signal S1. This control is called trajectory control or contour motion control. A trajectory passing along the route designated by the command signal S1 or the like is called the command trajectory. A trajectory that the machining head 64 or the like passes as a result of the control is called the response trajectory.

The processing machine 1 causes the machining head 64 to draw a trajectory having a two-dimensional shape or a three-dimensional shape by using a plurality of feed axes driven by the motor 32. In the processing machine 1, position detectors 35 are attached to the respective feed axes. Feedback control of the motor 32 is performed by using detection signals detected by the position detectors 35. Specifically, the feedback control is performed such that the difference between the position (a feedback position) of the motor 32 detected by the position detectors 35 and the command position of the motor 32 designated by the command signal S1 decreases. Consequently, the machining head 64 moves while following a given command route to a high accuracy.

When a moving command of a circular shape (a circular trajectory) is given to the machining head 64, the feed axes perform motions to draw trajectories having a sine wave shape. For example, when a circular command is given within the XY plane, the X axis has a sine wave and the Y axis has a waveform shifted by 90° phase with respect to the sine wave of the X axis. A feedback trajectory desirably coincides with the command trajectory. However, in reality, a trajectory error occurs between the feedback trajectory and the command trajectory because of various factors.

As a representative trajectory error, there is quadrant projection. This is a phenomenon in which a moving direction of any one of the feed axes is reversed at a point (a position) where a quadrant of an arc is switched. In the feed axis, friction occurs in the contact section of a ball screw, a guide, and the like and acts on the control system as disturbance. The disturbance due to the friction acts in the opposite direction to the moving direction. Therefore, the direction in which the friction, which is the disturbance, acts changes at a point where the moving direction is reversed.

When the acting direction of the friction changes, the control system responds to the change in the disturbance with a fixed delay. Therefore, a following error occurs in the response trajectory. As a result, the response trajectory passes slightly to the outer side of the command trajectory immediately after the switching of the quadrant. This error is usually an extremely slight error. Therefore, a method of enlarging and plotting an error of the radius of the response trajectory with respect to the radius of the command trajectory is performed. When the error is plotted in this way, an error due to a following delay immediately after the quadrant switching appears as a projection to the outer side. Therefore, this error is called a quadrant projection.

As the trajectory error appearing in the feedback trajectory, there is inward turning due to a servo response delay. As a frequency characteristic of the control system from command positions to feedback positions of the axes, in general, gain characteristics decreases as frequency increases. During the circular command, the axes perform a sine wave motion having, as a frequency, a value obtained by dividing command speed by an arc radius. Therefore, the radius of the feedback trajectory decreases according to a decrease in the gain of the control system at the frequency. As a result, the feedback trajectory turns on the inner side of the command trajectory. In general, as the frequency of an arc increases, i.e., the radius of the arc becomes smaller and the command speed becomes larger, the degree of the inward turning of the feedback trajectory with respect to the command radius increases.

In the processing machine 1, which includes a plurality of feed axes, feedback control is independently performed on the feed axes. Therefore, when a difference occurs in a response characteristic from the command positions to the feedback positions of the axes because of the setting of the control system, the rigidity of the machine system 30, and the like, the feedback trajectory is warped into an elliptical shape with respect to the coordinate axis direction. In particular, when a gain characteristic is different, a warp occurs in axial directions of the X axis and the Y axis. In contrast, when a phase characteristic is different, the feedback trajectory is warped in an oblique direction with respect to the axial directions.

When a trajectory error is large, machining accuracy of the machining head 64 is deteriorated. Therefore, the trajectory measuring device 10 measures a trajectory error that occurs in the feedback trajectory because of the influence of the quadrant projection, the inward turning, a response difference among the axes, and the like when a circular motion is performed. The trajectory measuring device 10 in this embodiment generates circular trajectories of two designated axes by using data (the command signals S1, the command conditions C1, and the feedback signals S2) of three or more measured axes. In the processing machine 1, adjustment of control parameters, review of a machine configuration and the like are performed on the basis of a result of the measurement. Consequently, the processing machine 1 performs highly accurate machining.

A processing procedure of the processing machine 1 in measuring a circular trajectory is explained here. The radius of a circular command, feed velocity, and an inter-axis phase difference are input to the command-condition input unit 11 as the command conditions C1 (numerical data). The command conditions C1 are input, for example, by the user.

For example, R (m) is input to the command-condition input unit 11 as the radius of the circular command and F (m/s) is input to the command-condition input unit 11 as the feed velocity. The inter-axis phase difference is set for each combination of any two axes among the machine's movable axes. For example, inter-axis phase differences with an inter-axis phase difference between the X axis and the Y axis set as $\phi_{xy}$(rad) and an inter-axis phase difference between the X axis and the Z axis set as $\phi_{xz}$(rad) are input to the command-condition input unit 11.

If the inter-axis phase difference $\phi_{xz}$ between the X axis and the Z axis and the inter-axis phase difference $\phi_{xy}$ between the X axis and the Y axis are determined, an inter-axis phase difference $\phi_{yz}$ between the Y axis and the Z axis is automatically determined as a difference between the inter-axis phase difference $\phi_{xz}$ and the inter-axis phase difference $\phi_{xy}$. That is, the inter-axis phase difference $\phi_{yz}$ is $\phi_{yz}=\phi_{xz}-\phi_{xy}$. The command-condition input unit 11 outputs the command conditions C1 to the command generating unit 12 and the circular-trajectory calculating unit 15.

The command generating unit 12 generates sine wave signals used as position commands for the respective axes of the X axis, the Y axis, and the Z axis. In a usual circular command, the command generating unit 12 generates two sine wave signals having phases 90° different from each other and sets the sine wave signals as command signals of the two axes. However, in this embodiment, the command generating unit 12 generates three sine wave signals (command signals S1) according to conditions explained below.

(A) The amplitude of a sine wave is set to an arc radius R in all the axes.

(B) The frequency of the sine wave is set to a value obtained by dividing feed velocity F by the arc radius R. That is, when the frequency of the sine wave is represented by ω(rad/s), the frequency is ω=F/R.

(C) A sine wave of the Y axis is delayed by the inter-axis phase difference $\phi_{xy}$ between the X axis and the Y axis with respect to a sine wave of the X axis. Similarly, a sine wave of the Z axis is delayed by the inter-axis phase difference $\phi_{xz}$ between the X axis and the Z axis with respect to the sine wave of the X axis.

Given that command signals generated for the axes according to the above conditions are represented as $X_r(t)$, $Y_r(t)$, and $Z_r(t)$, these command signals are represented by the following Expression (1). Note that the origin of a coordinate system is set in the center of an arc. However, the origin of the coordinate system can be translated to any position according to necessity.

$$X_r(t)=R \sin \omega t$$

$$Y_r(t)=R \sin(\omega t-\phi_{xy})$$

$$Z_r(t)=R \sin(\omega t-\phi_{xz}) \quad (1)$$

The command generating unit 12 sends the generated command signal S1 to the feedback-signal acquiring unit 13. The feedback-signal acquiring unit 13 performs servo control for each of the X axis, the Y axis, and the Z axis. The servo control unit 20 performs feedback control such that feedback positions (X(t), Y(t), and Z(t)), measured by the position detectors 35 that are attached to the axes, follow the command signals S1 of the axes.

As the feedback control, servo control such as PID control is performed. In the processing machine 1 in this embodiment, the feedback control system illustrated in FIG. 4 is used as feedback control systems of the axes. Note that feed-forward control can be applied to the processing machine 1 according to necessity.

The display-target-axis designating unit 14 outputs a set of two axes that are set as targets of circular trajectory display (calculation targets of a circular trajectory) to the circular-trajectory calculating unit 15. In this embodiment, because the movable axes are the three axes, i.e., the X axis, the Y axis, and the Z axis, the display-target-axis designating unit 14 sets three combinations, i.e., the X axis and the Y axis, the Y axis and the Z axis, and the X axis and the Z axis, and outputs the combinations.

The circular-trajectory calculating unit 15 calculates data for drawing circular trajectories of the combinations (planes) of the axes designated by the display-target-axis designating unit 14 on the basis of the command signals S1, the feedback signals S2, and the command conditions C1. The circular-trajectory calculating unit 15 sends drawing data (circular trajectory data), which is a calculation result, to the display unit 16. Consequently, the display unit 16 causes an external display device (not illustrated in the figure) such as a display device to display the circular trajectory data calculated by the circular-trajectory calculating unit 15.

In the following explanation, a combination of display target axes is a combination of the X axis and the Y axis. However, the circular-trajectory calculating unit 15 can perform the calculation in the same manner even if the combination of the display target axes might be other combinations.

The circular-trajectory calculating unit 15 sets one of the two axes, which are the display target axes, as a reference axis and sets the other as an adjustment axis. In the following explanation, the circular-trajectory calculating unit 15 sets the X axis as the reference axis and sets the Y axis as the adjustment axis. However, the reference axis and the adjustment axis can be reversed.

For the X axis that is the reference axis, the circular-trajectory calculating unit 15 directly uses the command signal S1 of the X axis and the feedback signal S2 of the X axis as the command signal S1 for displaying and the feedback signal S2 for displaying. Therefore, an X-axis command signal $X_{rd1}(t)$ for displaying and an X-axis feedback signal $X_{d1}(t)$ for displaying are respectively represented by the following Expression (2) and Expression (3).

$$X_{rd1}(t)=X_r(t) \quad (2)$$

$$X_{d1}(t)=X(t) \quad (3)$$

For the Y axis, which is the adjustment axis, the circular-trajectory calculating unit 15 adjusts timing such that a phase difference (an inter-axis phase difference) from the X axis is 90°, that is, (pi/2)rad. This operation is equivalent to shifting of time by ¼ cycle with respect to time series data of the command signal S1 of the Y axis.

Specifically, the circular-trajectory calculating unit 15 performs adjustment of timing as explained below. First, the circular-trajectory calculating unit 15 extracts the command signal S1 and the feedback signal S2 used for two movable axis, which are coordinate axes of a plane (the XY plane) set as a calculation target.

The circular-trajectory calculating unit 15 calculates a cycle of a circular command from an arc radius and feed velocity. The circular-trajectory calculating unit 15 multiplies the circular radius with 2π (π is the circular constant) and sets a value obtained by dividing the arc radius by the feed velocity as a cycle T of the circular command. Therefore, the cycle T of the circular command is T=2πR/F.

Further, the circular-trajectory calculating unit 15 calculates time $T_d$ equivalent to an intern-axis phase difference of a command. The time $T_d$ is calculated by multiplying, with the cycle of the circular command, a value obtained by dividing an inter-axis phase difference between the reference axis and the adjustment axis by 2π. Therefore, the time $T_d$ is $T_d=\phi_{xy} \cdot T/(2\pi)=\phi_{xy} \cdot R/F$. The circular-trajectory calculating unit 15 sets, as timing adjustment time $T_a$, time obtained by subtracting the time $T_d$ corresponding to the inter-axis phase difference from time of ¼ of the cycle T of the circular command. The cycle T of the circular command is decided from the arc radius and the feed velocity. The time $T_d$ is decided from the inter-axis phase difference between calculation target axes and the cycle of the circular command. When the X axis is set as the reference axis and the Y axis is set as the adjustment axis, timing adjustment time $T_{a1}$ is represented by the following Expression (4).

$$T_{a1} = \frac{T}{4} - T_d = \left(\frac{\pi}{2} - \phi_{xy}\right)\frac{R}{F} \quad (4)$$

In this way, the value obtained by multiplying, with the arc radius, the value obtained by subtracting the inter-axis phase difference between the reference axis and the adjustment axis from (π/2)rad, that is, 90° and further dividing the multiplied value by the feed velocity is the timing adjustment time $T_{a1}$.

The circular-trajectory calculating unit 15 sets the command signal for the adjustment axis for display to a signal delayed by the timing adjustment time $T_{a1}$ with respect to the original command signal S1. Because the Y axis is the adjustment axis, a command signal $Y_{rd1}(t)$ of the Y axis for display is represented by the following Expression (5).

$$Y_{rd1}(t)=Y_r(t-T_{a1}) \tag{5}$$

When Expression (4) is substituted in Expression (5) and Expression (5) is arranged by using a relation of $\omega=F/R$, the command signal $Y_{rd1}(t)$ of the Y axis for display is represented by the following Expression (6).

$$Y_{rd1}(t) = \sin\left(\omega t - \frac{\pi}{2}\right) \tag{6}$$

In this way, the command signal $Y_{rd}(t)$ of the Y axis for display is a signal with a phase shifted by 90° from the command signal $X_r(t)$ of the X axis. When $X_r(t)$ and $Y_{rd}(t)$ are plotted on the XY plane, a perfect circular trajectory is formed.

The circular-trajectory calculating unit 15 calculates a signal delayed by the timing adjustment time $T_{d1}$ from the original feedback signal. The circular-trajectory calculating unit 15 sets a calculation result as the feedback signal S2 of the adjustment axis for display. Because the Y axis is the adjustment axis, the Y-axis feedback signal $Y_{d1}(t)$ is represented by the following Expression (7).

$$Y_{d1}(t)=Y(t-T_{a1}) \tag{7}$$

The command signal S1 is calculated as a perfect sine wave. Therefore, it is easy to adjust the phase of the command signal S1. However, it is difficult to adjust the phase of the feedback signal S2 because disturbance or the like acts on the feedback signal S2. Therefore, in this embodiment, the circular-trajectory calculating unit 15 adjusts timing of the feedback signal S2 by time same as timing adjustment time at the time when the inter-axis phase difference of the command signal S1 is 90° such that the inter-axis phase difference of the feedback signal for display is accurately 90°.

When the display target axes are other than the combination of the X axis and the Y axis, the circular-trajectory calculating unit 15 can calculate circular trajectory for display in the same manner as the case of the combination of the X axis and the Y axis by changing the timing adjustment time of Expression (4). Timing adjustment time $T_{a2}$ at the time when the Y axis is set as the reference axis and the Z axis is set as the adjustment axis is represented by the following Expression (8).

$$T_{a2} = \left(\frac{\pi}{2} - \phi_{yz}\right)\frac{R}{F} \tag{8}$$

In this case, the circular-trajectory calculating unit 15 calculates a Y-axis command signal $Y_{rd2}(t)$ for display, a Y-axis feedback signal $Y_{d2}(t)$, a Z-axis command signal $Z_{rd2}(t)$, and a Z-axis feedback signal $Z_{d2}(t)$ respectively according to the following Expressions (9) to (12).

$$Y_{rd2}(t)=Y_r(t) \tag{9}$$

$$Y_{d2}(t)=Y(t) \tag{10}$$

$$Z_{rd2}(t)=Z_r(t-T_{a2}) \tag{11}$$

$$Z_{d2}(t)=Z(t-T_{a2}) \tag{12}$$

Timing adjustment time $T_{a3}$ at the time when the X axis is set as the reference axis and the Z axis is set as the adjustment axis is represented by the following Expression (13).

$$T_{a3} = \left(\frac{\pi}{2} - \phi_{xz}\right)\frac{R}{F} \tag{13}$$

In this case, the circular-trajectory calculating unit 15 calculates an X-axis command signal $X_{rd3}(t)$, an X-axis feedback signal $X_{d3}(t)$, a Z-axis command signal $Z_{rd3}(t)$, and a Z-axis feedback signal $Z_{d3}(t)$ for display respectively according to the following Expressions (14) to (17).

$$X_{rd3}(t)=X_r(t) \tag{14}$$

$$X_{d3}(t)=X(t) \tag{15}$$

$$Z_{rd3}(t)=Z_r(t-T_{a3}) \tag{16}$$

$$Z_{d3}(t)=Z(t-T_{a3}) \tag{17}$$

An operation example of the processing machine 1 in this embodiment is explained. An operation example is explained in which a circular radius of the processing machine 1 having the X axis, the Y axis, and the Z axis is 10 millimeters, feed velocity of the processing machine 1 is 6 m/min, and all inter-axis phase differences is 0. Therefore, The inter-axis phase differences are $\phi_{xy}=\phi_{xz}=0$. At this point, a cycle of a circular command is 0.628 second.

As conditions of the control system, the position controller 27 performs proportional control, a proportional gain of the position controller 27 is set to 100 rad/s, a proportional gain and an integral gain of the speed controller 29 are respectively set to 600 rad/s and 150 rad/s. The same value is set as all of gains of the axes.

It is assumed that the machine system 30, which is the control target, is a rigid body and inertia of the machine systems 30 of the axes is 0.001 kgm². Further, it is assumed that Coulomb's friction acts on the motor 32. The magnitude of the Coulomb's friction is set to a double for the Y axis and set to a quadruple for the Z axis on the basis of the X axis. As the Coulomb's friction is larger, a quadrant projection during moving direction reversal is larger.

Further, in trajectory measurement, it is assumed that a sine wave signal having 1.5 cycles is used as the command signal S1. This is because, in measuring a circular command for one cycle, data is additionally necessary for the timing adjustment time and a steady portion moving at fixed feed velocity is extracted excluding transient portions at circular motion start time and end time.

The timing adjustment time is a value obtained by subtracting an inter-axis phase difference from ¼ cycle. Because the inter-axis phase difference is zero, data needs to be additionally acquired for the timing adjustment time equivalent to at least the ¼ cycle.

Time of the transient portions is generally a total of an acceleration/deceleration time constant and a response delay time of servo. Therefore, the trajectory measuring device 10 additionally acquires data for a cycle equivalent to this total time. The response delay time of servo is substantially equal to an inverse of a position proportional gain. Because the position proportional gain is set to 100 rad/s, the time of the transient portions is approximately 20 milliseconds, that is, a total of a command start time and a command end time. Because the cycle of the circular command is 0.628 second, concerning the influence of the transient portions, it is sufficient to additionally acquire data for the ¼ cycle.

Therefore, the trajectory measuring device 10 additionally measures data for ½ cycle, which is a total of the ¼ cycle equivalent to the timing adjustment time and the ¼ cycle for excluding the influence of the transient portions.

Figure 5:
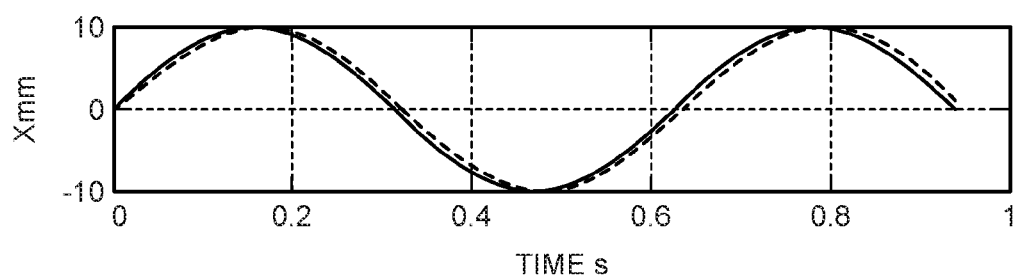
FIG. 5 is a diagram illustrating temporal changes in the command position and the feedback position for the X axis in the first embodiment.
Figure 6:
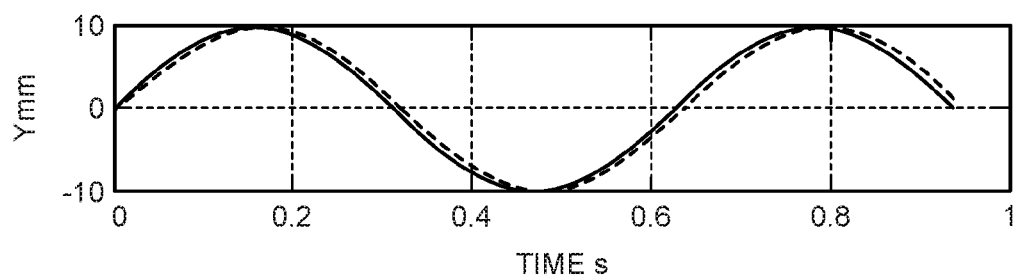
FIG. 6 is a diagram illustrating temporal changes in the command position and the feedback position for the Y axis in the first embodiment.
Figure 7:
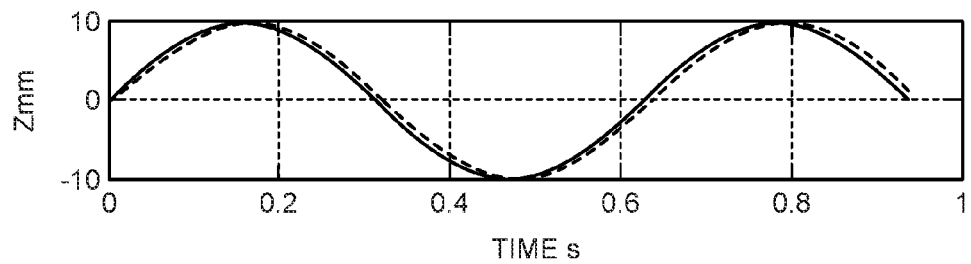
FIG. 7 is a diagram illustrating temporal changes of the command position and the feedback position of a Z axis in the first embodiment.

To check appropriateness of a circular trajectory at the time when the command signal is generated under the conditions explained above, feedback signals of the axes are calculated by a numerical simulation. FIG. 5 to FIG. 7 illustrate temporal changes of command positions and feedback positions of the axes.

FIG. 5 is a diagram illustrating temporal changes of a command position and a feedback position of the X axis in the first embodiment. FIG. 6 is a diagram illustrating temporal changes of a command position and a feedback position of the Y axis in the first embodiment. FIG. 7 is a diagram illustrating temporal changes of a command position and a feedback position of the Z axis in the first embodiment. The abscissa of FIG. 5 to FIG. 7 indicates time and the ordinate indicates the position (a command position and a feedback position) of the machining head 64. A solid line represents the command position and a broken line represents the feedback position in characteristics illustrated in FIG. 5 to FIG. 7.

Figure 8:
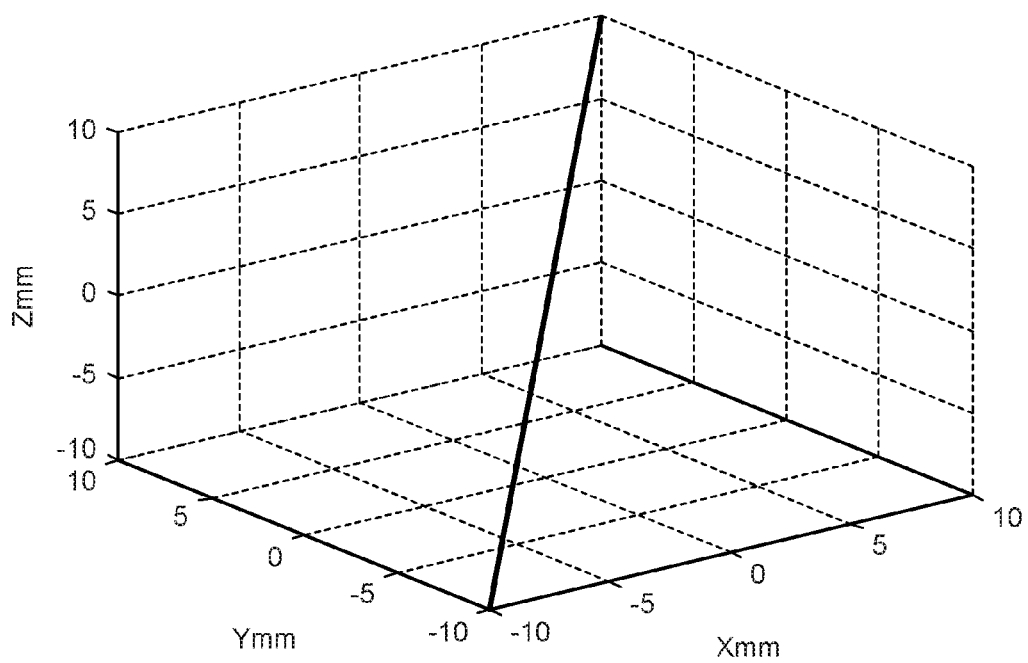
FIG. 8 is a diagram illustrating the positional change of the machining head within a three-dimensional space in the first embodiment.

FIG. 8 is a diagram illustrating a positional change of the machining head within a three-dimensional space in the first embodiment. In FIG. 8, a command route of the machining head 64 is illustrated. A position command starts from (X, Y, Z)=(0, 0, 0) mm. In the position command, after the machining head 64 is caused to reach (10, 10, 10) mm, a moving direction is reversed to cause the machining head 64 to reach (−10, −10, −10) mm. Further, in the position command, the machining head 64 is caused to reach (−10, −10, −10) mm, the moving direction is reversed again to cause the machining head 64 to reach (10, 10, 10) mm, and the moving direction is further reversed. The position command causes the machining head 64 to end in a position of (0, 0, 0) mm.

In this way, the position command is a command for moving the machining head 64 in a reciprocating manner on a linear route within the three-dimensional space. The feedback signals S2 of the axes follow the command signals S1 of the axes with a delay of approximately 10 milliseconds.

Subsequently, the circular-trajectory calculating unit 15 calculates circular trajectories for display at the time when the display target axes are set to three kinds, that is, (a) the X axis and the Y axis, (b) the Y axis and the Z axis, and (c) the X axis and the Z axis.

When the display target axes are set to (a) the X axis and the Y axis (when a circular trajectory on the XY plane is calculated)

In this case, the circular-trajectory calculating unit 15 sets data for ⅜ cycle to one cycle as data for display of the X axis. That is, the circular-trajectory calculating unit 15 uses data in a period of 0.628×⅜=0.236 second to 0.628 second as the data for display of the X axis. The timing adjustment time is 0.157 second from Expression (4). Therefore, the timing adjustment time is data delayed by 0.157 second from the data of the X axis. Consequently, the circular-trajectory calculating unit 15 uses data in a period of 0.236−0.157=0.079 second to 0.628 second as data for display of the Y axis.

When the display target axes are set to (b) the Y axis and the Z axis (when a circular trajectory on the YZ plane is calculated)

In this case, the circular-trajectory calculating unit 15 sets data for ⅜ cycle to one cycle as the data for display of the Y axis. That is, the circular-trajectory calculating unit 15 uses data in a period of 0.628×⅜=0.236 second to 0.628 second as the data for display of the Y axis. The timing adjustment time is 0.157 second from Expression (8). Therefore, the timing adjustment time is data delayed by 0.157 second from the data of the Y axis. Consequently, the circular-trajectory calculating unit 15 uses data in a period of 0.236−0.157=0.079 second to 0.628 second as data for display of the Z axis.

When the display target axes are set to (c) the X axis and the Z axis (when a circular trajectory on the XZ plane is calculated)

In this case, the circular-trajectory calculating unit 15 sets data for ⅜ cycle to one cycle as the data for display of the X axis. That is, the circular-trajectory calculating unit 15 uses data in a period of 0.628×⅜=0.236 second to 0.628 second as the data for display of the X axis. The timing adjustment time is 0.157 second from Expression (13). Therefore, the timing adjustment time is data delayed by 0.157 second from the data of the X axis. Consequently, the circular-trajectory calculating unit 15 uses data in a period of 0.236−0.157=0.079 second to 0.628 second as data for the display of the Z axis.

Figure 9:
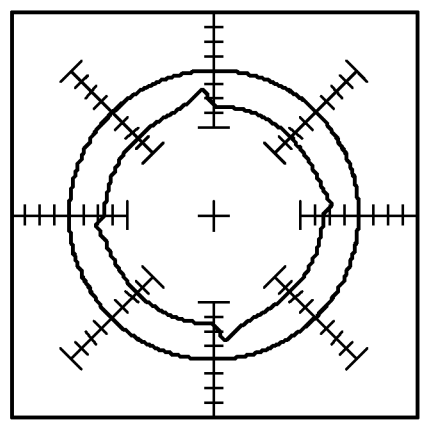
FIG. 9 is a diagram illustrating a feedback position trajectory on an XY plane in the first embodiment.
Figure 10:
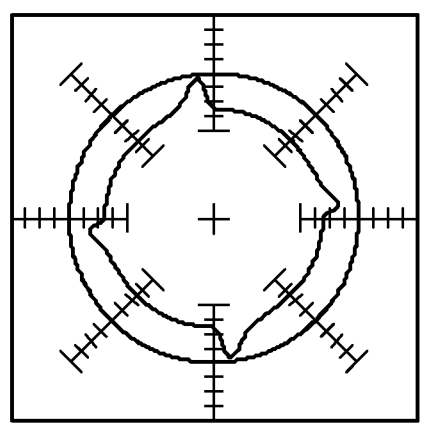
FIG. 10 is a diagram illustrating a feedback position trajectory on an YZ plane in the first embodiment.
Figure 11:
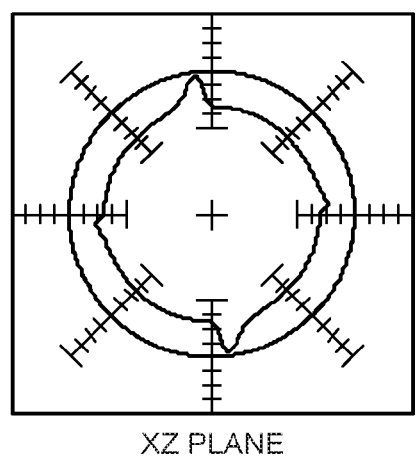
FIG. 11 is a diagram illustrating a feedback position trajectory on an XZ plane in the first embodiment.

The circular trajectories on the XY plane, the YZ plane, and the XZ plane with the radius of 10 millimeters calculated from the trajectories of the feedback positions as explained above are respectively illustrated in FIG. 9 to FIG. 11. FIG. 9 is a diagram illustrating the feedback position trajectory on the XY plane in the first embodiment. FIG. 10 is a diagram illustrating the feedback position trajectory on the YZ plane in the first embodiment. FIG. 11 is a diagram illustrating the feedback position trajectory on the XZ plane in the first embodiment.

In FIG. 9 to FIG. 11, errors are enlarged to 50 times in the radial direction to plot trajectories (20 μm/1 scale). As illustrated in FIG. 9 to FIG. 11, on all the planes, inward turning due to a servo response delay occurs. A quadrant projection is larger in the Y axis than in the X axis and much larger in the Z axis than in the Y axis according to the magnitudes of the Coulomb's friction of the axes. This indicates that feedback trajectory display of plane arcs is correctly performed.

For example, in the case of the machine including the three axes of the X axis, the Y axis, and the Z axis, in order to display circular trajectories on the planes of the XY plane, the YZ plane, and the XZ plane, it has been necessary to perform measurement three times. On the other hand, the trajectory measuring device 10 in the first embodiment generates the circular trajectories of the two designated axes by using the measured data of the three or more axes. Therefore, it is possible to display the circular trajectories on the planes in one measurement. Therefore, it is possible to greatly reduce a measurement time.

The trajectory measuring device 10 adjusts the timing of the feedback signal S2 by time same as the timing adjustment time at the time when the inter-axis phase difference of the command signal S1 is 90°. Therefore, it is possible to draw a trajectory by adjusting timing of the command data (the command signal S1) and the feedback data (the feedback signal S2).

The time obtained by subtracting the time $T_d$ equivalent to the inter-axis phase difference from the time of ¼ of the cycle of the circular command is set as the timing adjustment time $T_a$. Therefore, it is possible to accurately calculate the timing adjustment time $T_a$.

Further, a moving trajectory during measurement is made linear by setting all the inter-axis phase differences to 0.

Therefore, compared with when the machining head 64 moves on the circular trajectory, it is easy to secure a range necessary for movement of a tool end (a distal end portion of the machining head 64).

The trajectory measuring device 10 can reduce a parameter adjustment time of the feedback control system by reducing a measurement time of the circular trajectory. The servo control system has parameters such as a control gain and a friction correction parameter. It is necessary to adjust these parameters while checking a feedback trajectory such that errors (an inward turning amount and a quadrant projection amount) with respect to a command trajectory of the feedback trajectory decrease. However, in this embodiment, it is possible to reduce a work time for the check.

In this way, according to the first embodiment, the circular trajectories of the two designated axes are generated by using the measured data of the three or more axes. Therefore, it is possible to efficiently measure a moving trajectory in the processing machine 1 including the three or more feed axes.

Second Embodiment

A second embodiment of the present invention is explained with reference to FIG. 12 to FIG. 18. In the second embodiment, the trajectory measuring device 10 having a configuration same as the configuration in the first embodiment is used. The second embodiment is different from the first embodiment in setting of an inter-axis phase difference.

Figure 13:
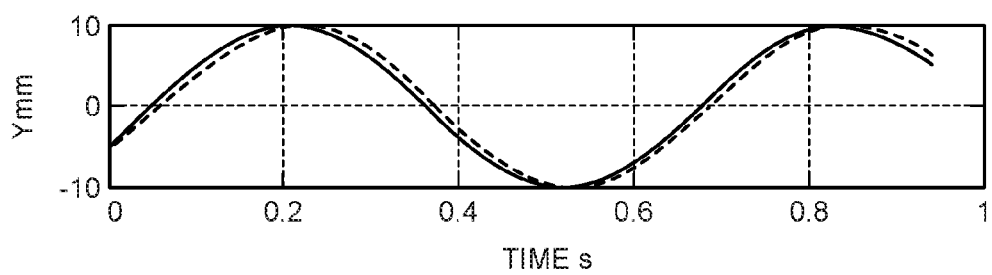
FIG. 13 is a diagram illustrating temporal changes in the command position and the feedback position for the Y axis in the second embodiment.
Figure 14:
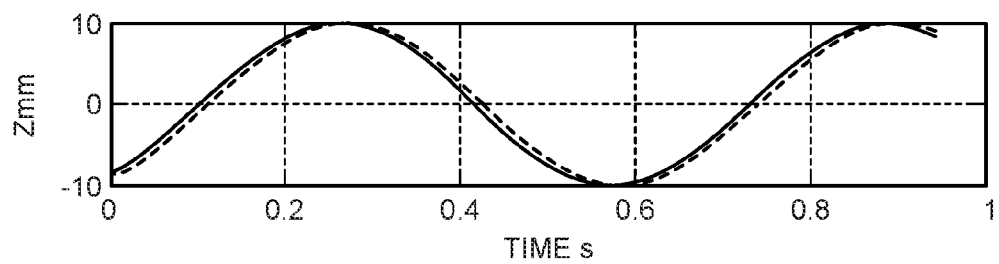
FIG. 14 is a diagram illustrating temporal changes in the command position and the feedback position of the Z axis in the second embodiment.

In the second embodiment, the inter-axis phase difference is set to a value that is neither 0° nor a multiple of 90° as explained below. In the following explanation in this embodiment, the Y axis is later than the X axis by 30° in phase and the Z axis is later than the X axis by 60° in phase. Specifically, the inter-axis phase difference in this embodiment is $\phi_{xy}=30(°)=\pi/6$ (rad), $\phi_{xz}=60(°)=\pi/3$ (rad). Other command conditions and parameters of a feedback control system are the same as those in the first embodiment. Temporal changes of command signals and feedback signals of the axes in this case are illustrated in FIG. 12 to FIG. 14.

Figure 12:
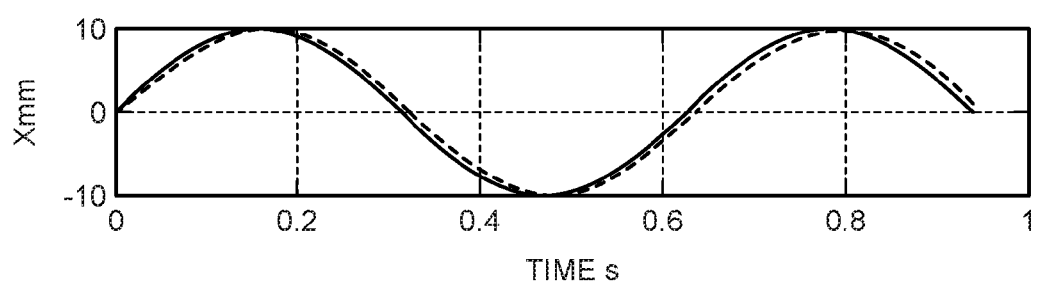
FIG. 12 is a diagram illustrating temporal changes in the command position and the feedback position for the X axis in a second embodiment.

FIG. 12 is a diagram illustrating temporal changes of a command position and a feedback position of the X axis in the second embodiment. FIG. 13 is a diagram illustrating temporal changes of a command position and a feedback position of the Y axis in the second embodiment. FIG. 14 is a diagram illustrating temporal changes of a command position and a feedback position of the Z axis in the second embodiment. The abscissa of FIG. 12 to FIG. 14 indicates time and the ordinate indicates the position (a command position and a feedback position) of the machining head 64. A solid line represents the command position and a broken line represents the feedback position in characteristics illustrated in FIG. 12 to FIG. 15.

Figure 15:
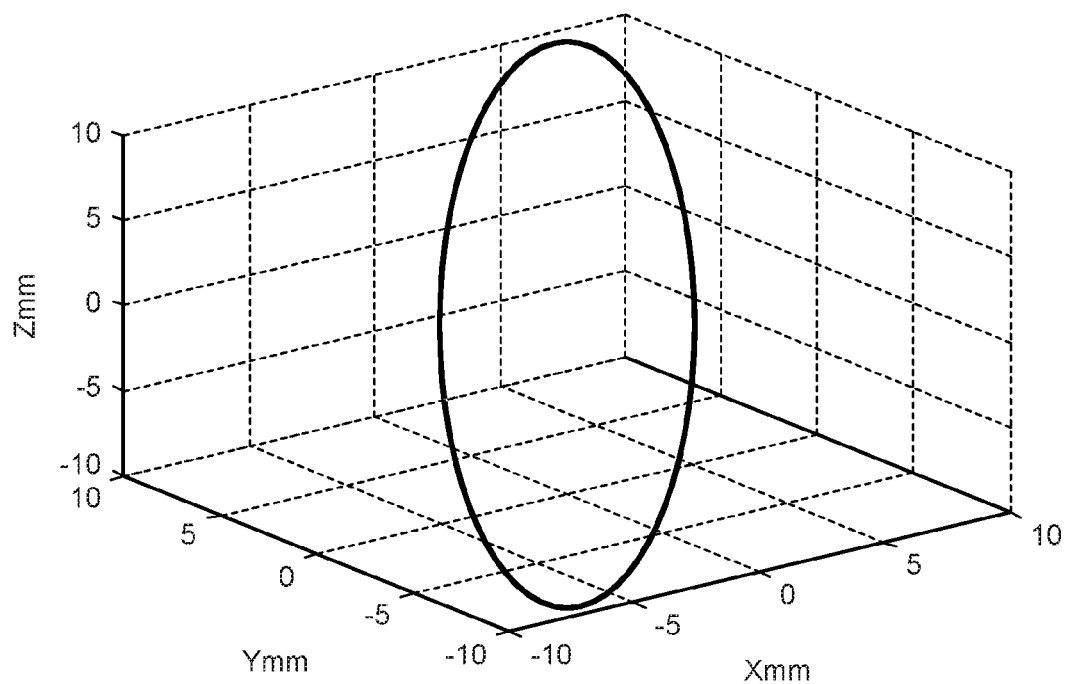
FIG. 15 is a diagram illustrating the positional change of the machining head within a three-dimensional space in the second embodiment.

FIG. 15 is a diagram illustrating a positional change of the machining head within a three-dimensional space in the second embodiment. In FIG. 15, a command route of the machining head 64 is illustrated. A position command is a command starting from (X, Y, Z)=(0, 5, 8.66) mm and, within the three-dimensional space, a command for moving an elliptical route. The feedback signals S2 of the axes follow the command signals S1 of the axes with a delay of approximately 10 milliseconds.

The circular-trajectory calculating unit 15 calculates circular trajectories for display at the time when the display target axes are set to three kinds, that is, (a) the X axis and the Y axis, (b) the Y axis and the Z axis, and (c) the X axis and the Z axis.

When the display target axes are set to (a) the X axis and the Y axis (when a circular trajectory on the XY plane is calculated)

In this case, the circular-trajectory calculating unit 15 sets data for ⅜ cycle to one cycle as data for display of the X axis. That is, the circular-trajectory calculating unit 15 uses data in a period of 0.628×⅜=0.236 second to 0.628 second as the data for display of the X axis. The timing adjustment time is 0.105 second from Expression (4). Therefore, the timing adjustment time is data delayed by 0.105 second from the data of the X axis. Consequently, the circular-trajectory calculating unit 15 uses data in a period of 0.236−0.105=0.131 second to 0.628 second as data for display of the Y axis.

When the display target axes are set to (b) the Y axis and the Z axis (when a circular trajectory on the YZ plane is calculated)

In this case, the circular-trajectory calculating unit 15 sets data for ⅜ cycle to one cycle as the data for display of the Y axis. That is, the circular-trajectory calculating unit 15 uses data in a period of 0.628×⅜=0.236 second to 0.628 second as the data for display of the Y axis. The timing adjustment time is 0.105 second from Expression (8). Therefore, the timing adjustment time is data delayed by 0.105 second from the data of the Y axis. Consequently, the circular-trajectory calculating unit 15 uses data in a period of 0.236−0.105=0.131 second to 0.628 second as data for display of the Z axis.

When the display target axes are set to (c) the X axis and the Z axis (when a circular trajectory on the XZ plane is calculated)

In this case, the circular-trajectory calculating unit 15 sets data for ⅜ cycle to one cycle as the data for display of the X axis. That is, the circular-trajectory calculating unit 15 uses data in a period of 0.628×⅜=0.236 second to 0.628 second as the data for display of the X axis. The timing adjustment time is 0.052 second from Expression (13). Therefore, the timing adjustment time is data delayed by 0.052 second from the data of the X axis. Consequently, the circular-trajectory calculating unit 15 uses data in a period of 0.236−0.052=0.184 second to 0.628 second as data for the display of the Z axis.

Figure 16:
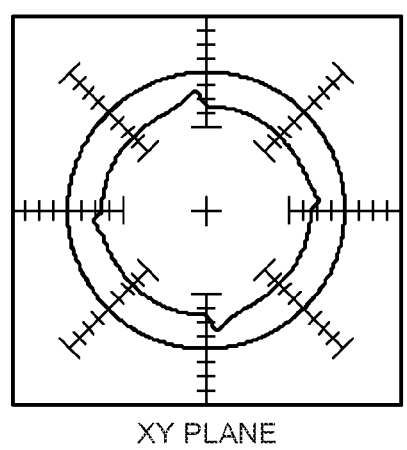
FIG. 16 is a diagram illustrating the feedback position trajectory on an XY plane in the second embodiment.
Figure 17:
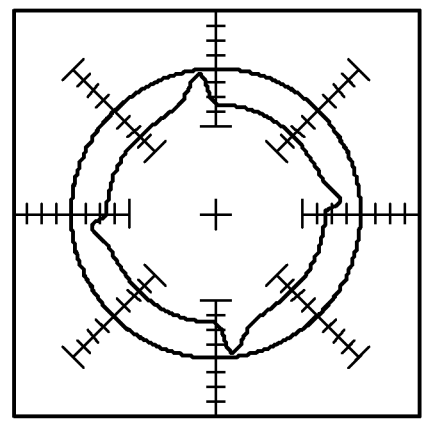
FIG. 17 is a diagram illustrating the feedback position trajectory on an YZ plane in the second embodiment.
Figure 18:
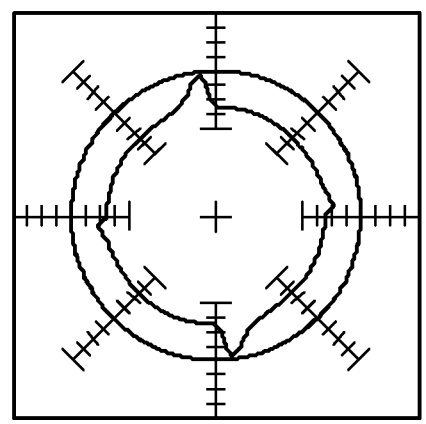
FIG. 18 is a diagram illustrating the feedback position trajectory on an XZ plane in the second embodiment.

The circular trajectories on the XY plane, the YZ plane, and the XZ plane calculated from the trajectories of the feedback positions as explained above are respectively illustrated in FIG. 16 to FIG. 18. FIG. 16 is a diagram illustrating the feedback position trajectory on the XY plane in the second embodiment. FIG. 17 is a diagram illustrating the feedback position trajectory on the YZ plane in the second embodiment. FIG. 18 is a diagram illustrating the feedback position trajectory on the XZ plane in the second embodiment.

In FIG. 16 to FIG. 18, errors are enlarged to 50 times in the radial direction to plot trajectories. On all the planes, inward turning due to a servo response delay occurs. A quadrant projection is larger in the Y axis than in the X axis and much larger in the Z axis than in the Y axis according to the magnitudes of the Coulomb's friction of the axes. This indicates that feedback trajectory display of plane arcs is correctly performed.

Like the trajectory measuring device 10 in the first embodiment, the trajectory measuring device 10 in the second embodiment is capable of displaying circular trajectories on the planes in one measurement. It is possible to greatly reduce a measurement time.

The trajectory measuring device 10 can generate the circular trajectories of the two designated axes from the measured data of the three or more axes, draw a trajectory by adjusting timing of the command data and the feedback data, and accurately calculate a timing adjustment time in drawing the trajectory.

Further, because the inter-axis phase difference is set to the value that is neither 0° nor a multiple of 90°, reversal of movable axes does not simultaneously occur. Therefore, for example, when a shock occurs during movement and reversal of the movable axes and affects behavior of the other axes, it is possible to accurately measure a quadrant projection error during movable axis moving direction reversal.

In this way, according to the second embodiment, the circular trajectories of the two designated axes are generated by using the measured data of the three or more axes. Therefore, it is possible to efficiently measure a moving trajectory in the processing machine 1 including the three or more feed axes.

Note that, in the explanation in the first and second embodiments, the number of axes of the processing machine 1 is three. However, the number of axes can be four or more. For example, in a five-axis processing machine including three rectilinear axes and two rotation axis, sine wave signals are simultaneously input to all of the rectilinear axes and the rotation axes. In this case, the trajectory measuring device 10 can calculate, from command signals and feedback signals obtained as a result of the input of the sine wave signals, a circular trajectory in a plane having any two axes as coordinate axes and display the circular trajectory.

In this embodiment, the trajectory measuring device 10 and the NC device 50 are separately configured. However, the trajectory measuring device 10 can be disposed in the NC device 50. In this embodiment, the trajectory measuring device 10 and the servo control unit 20 are connected via the NC device 50. However, the trajectory measuring device 10 and the servo control unit 20 can be connected not via the NC device 50. In this case, the command signals S1X, S1Y, and S1Z are sent from the feedback-signal acquiring unit 13 to the servo control unit 20. The feedback signals S2X, S2Y, and S2Z are respectively sent from the servo control units 20 to 22 to the feedback-signal acquiring unit 13.

The NC device 50 can independently generate the command signal S1. The trajectory measuring device 10 can measure a moving trajectory of the machining head 64 by using the command signal S1 generated by the NC device 50. In the explanation in this embodiment, the trajectory measuring device 10 is applied to the processing machine 1. However, the trajectory measuring device 10 can be applied to machines other than the processing machine 1.

INDUSTRIAL APPLICABILITY

As explained above, the trajectory measuring device, the numerical control device, and the trajectory measuring method according to the present invention are suitable for measurement of a motion trajectory at the time when a command is given to an axis feed driving system.

REFERENCE SIGNS LIST 1 processing machine
10 trajectory measuring device
11 command-condition input unit
12 command generating unit
13 feedback-signal acquiring unit
14 display-target-axis designating unit
15 circular-trajectory calculating unit
16 display unit
20 servo control unit
30 machine system
32 motor
33 load
35 position detector
40 moving target
50 NC device
61 X-axis movable unit
62 Y-axis movable unit
63 Z-axis movable unit
64 machining head
C1 command condition
S1 command signal
S2 feedback signal
S5 motor torque signal

The invention claimed is:

1. A trajectory measuring device that measures a moving trajectory of a moving target in a machine provided with three or more movable axes for the moving target, the trajectory measuring device comprising:
a display-target-axis designating unit that designates two movable axes, as display targets, out of measurement target movable axes that are the three or more movable axes;
a trajectory calculating unit that:
calculates the moving trajectory, on the basis of
command conditions for the moving target including a radius of a circular command, an inter-axis phase difference among the movable axes, and feed velocity used in measuring the moving trajectory,
command signals for the measurement target movable axes common to the measurement target movable axes generated as a sine wave signal that has an amplitude equal to the radius of the circular command and that has a frequency equal to a value obtained by dividing the feed velocity by the radius, and
feedback signals indicating positions of the measurement target movable axes when the movable axes are being controlled by using feedback such that the positions of the measurement target movable axes follow the command signals,
extracts, during the calculation, the command signals and the feedback signals for the two movable axes,
adjusts timing of one movable axis of the two movable axes such that the inter-axis phase difference of the command signals for the two movable axes is 90°, calculates an adjustment time of the timing, and
adjusts timing of the feedback signal of the one movable axis by using a time that is the same as the adjustment time so as thereby to calculate the moving trajectory; and
a display unit that displays the calculated moving trajectory on a plane defined by the two movable axes designated by the display-target-axis designating unit, wherein movement of the moving target is controlled based on the displayed moving trajectory.

2. The trajectory measuring device according to claim 1, further comprising:
a command-condition input unit to which the command conditions are input;
a command generating unit that generates, on the basis of the inter-axis phase difference, the command signal for each of the movable axes; and
a feedback-signal acquiring unit that acquires the feedback signals.

3. A numerical control device comprising:
a servo control unit that performs, on a machine that moves a moving target by using three or more movable axes, feedback control by using command signals for the movable axes;
a trajectory measuring device that measures a moving trajectory of the moving target, the trajectory measuring device comprising:
   a display-target-axis designating unit that designates two movable axes, as display targets, out of measurement target movable axes that are the three or more movable axes; and
   a trajectory calculating unit that:
      calculates the moving trajectory, on the basis of
         command conditions for the moving target including a radius of a circular command, an inter-axis phase difference among the movable axes, and feed velocity used in measuring the moving trajectory,
         command signals for the measurement target movable axes common to the measurement target movable axes generated as a sine wave signal that has an amplitude equal to the radius of the circular command and that has a frequency equal to a value obtained by dividing the feed velocity by the radius, and
         feedback signals indicating positions of the measurement target movable axes when the movable axes are being controlled by using feedback such that the positions of the measurement target movable axes follow the command signals,
      extracts, during the calculation, the command signals and the feedback signals for the two movable axes,
      adjusts timing of one movable axis of the two movable axes such that the inter-axis phase difference of the command signals for the two movable axes is 90°,
      calculates an adjustment time of the timing, and adjusts timing of the feedback signal of the one movable axis by using a time that is the same as the adjustment time so as thereby to calculate the moving trajectory, and
a display control unit that causes an external display device to display the moving trajectory calculated by the trajectory calculating unit on a plane defined by the two movable axes designated by the display-target-axis designating unit,
wherein movement of the moving target is controlled based on the displayed moving trajectory.

4. A trajectory measurement method for measuring a moving trajectory of a moving target in a machine that includes three or more movable axes for the moving target, the trajectory measurement method comprising:
designating two movable axes as display targets out of measurement target movable axes that are the three or more movable axes;
calculating the moving trajectory, on the basis of command conditions for the moving target including a radius of a circular command, an inter-axis phase difference among the movable axes, and feed velocity used in measuring the moving trajectory,
command signals for the measurement target movable axes common to the measurement target movable axes generated as a sine wave signal that has an amplitude equal to the radius of the circular command and that has a frequency equal to a value obtained by dividing the feed velocity by the radius, and
feedback signals indicating positions of the measurement target movable axes when the movable axes are controlled using feedback such that the positions of the measurement target movable axes follow the command signals,
extracting, in the calculating, the command signals and the feedback signals for the two movable axes,
adjusting timing of one movable axis of the two movable axes such that the inter-axis phase difference of the command signals for the two movable axes is 90°,
calculating an adjustment time of the timing,
adjusting timing of the feedback signal of the one movable axis by using a time that is the same as the adjustment time so as thereby to calculate the moving trajectory;
displaying the calculated moving trajectory on a plane defined by the two movable axes designated by the display-target-axis designating step; and
controlling movement of the moving target based on the displayed moving trajectory.

* * * * *